(12) United States Patent
Davison et al.

(10) Patent No.: US 9,241,194 B2
(45) Date of Patent: Jan. 19, 2016

(54) MULTI-VIEW OF MEDIA CONTENT (75) Inventors: Jeffrey T. Davison, Hancock, NH (US); Scott D. Arena, Peabody, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1003 days.

(21) Appl. No.: 12/607,489

(22) Filed: Oct. 28, 2009

(65) Prior Publication Data

US 2011/0099586 A1  Apr. 28, 2011

(51) Int. Cl.
*G06F 3/00* (2006.01)
*G06F 13/00* (2006.01)
*H04N 5/445* (2011.01)
*H04N 21/482* (2011.01)

(52) U.S. Cl.
CPC .................................. *H04N 21/482* (2013.01)

(58) Field of Classification Search
USPC ............ 725/56, 38, 41, 43, 48, 131, 139, 151
See application file for complete search history.

(56) References Cited

U.S. PATENT DOCUMENTS

| | | | | |
|---|---|---|---|---|
| 6,177,931 B1* | 1/2001 | Alexander et al. | ............... | 725/52 |
| 7,174,512 B2* | 2/2007 | Martin et al. | .................. | 715/719 |
| 8,813,133 B1* | 8/2014 | DePrez et al. | .................. | 725/61 |
| 2002/0054062 A1* | 5/2002 | Gerba et al. | .................. | 345/716 |
| 2002/0166122 A1* | 11/2002 | Kikinis et al. | .................. | 725/56 |
| 2006/0107291 A1* | 5/2006 | Heer | ............................... | 725/39 |
| 2009/0132942 A1* | 5/2009 | Santoro et al. | ............... | 715/765 |
| 2011/0093897 A1* | 4/2011 | Gerba et al. | .................... | 725/42 |

* cited by examiner

*Primary Examiner* — Nnenna Ekpo (57) ABSTRACT

In a content processing device, a set of media channels to be provided in a graphical user interface is identified. Each channel in a subset of the channels is assigned to a cell that is included in a set of cells in the graphical user interface. The graphical user interface is provided to a display. Upon a predetermined indication, at least some of the subset of the channels are rotated through at least a subset of the cells, whereby the display shows each of the cells in the subset of cells to be including a channel other than a channel that was included in the cell before the rotating was performed.

23 Claims, 12 Drawing Sheets

TLC
Full Screen
225

MULTI-VIEW OF MEDIA CONTENT

BACKGROUND INFORMATION

Viewers of video and other media content generally have a multitude of content available to them. For example, a content processing device such as a set top box may access many different media channels. Sorting through these many channels, and deciding which media content to access for viewing, listening, etc., can often be overwhelming. Often, viewers sequentially access tens or even hundreds of channels of media content in deciding which to access. Such access can be tedious and time-consuming. Further, a media provider may have difficulty in calling to the viewer's attention either channels that may be of interest to the viewer, or that the media provider may desire to promote, e.g., premium channels, pay-per-view channels, etc.

DETAILED DESCRIPTION OF PREFERRED EMBODIMENTS

Figure 1:
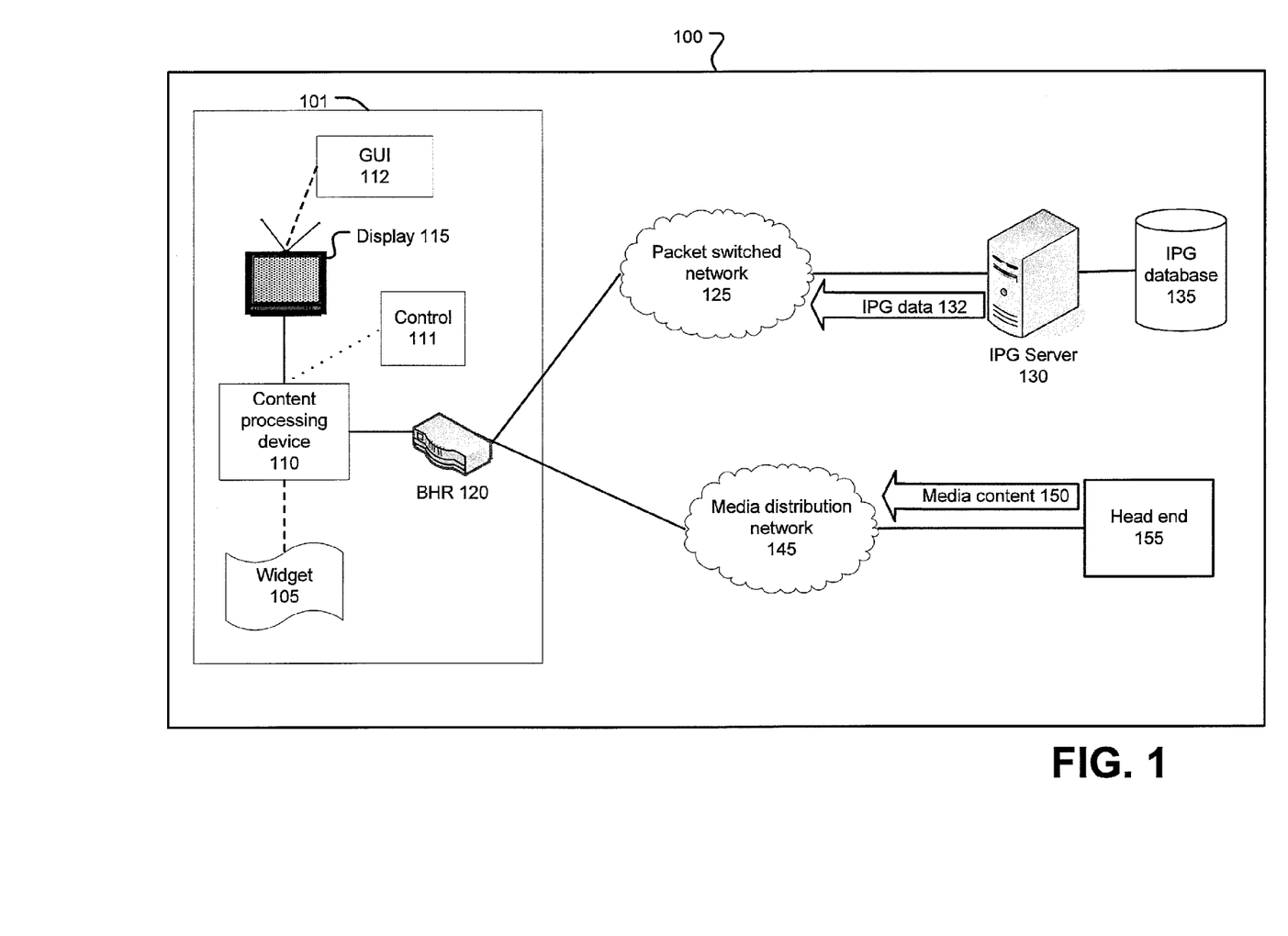
FIG. 1 illustrates an exemplary system for delivering an interactive program guide.

FIG. 1 illustrates an exemplary system 100 for delivering an interactive program guide.

As illustrated in FIG. 1, a customer premises 101 includes a content processing device 110, which may be controlled by a user through a control 111, to view video on a video display 115. Content processing device 110 may be a set top box (STB) or similar device known for receiving a media signal, e.g., a video signal, from a network and for providing media programming, e.g., audio, video, games, etc. to a device such as video display 115.

A widget 105 includes computer-executable instructions that are generally stored in a memory of content processing device 110, and that may be executed by a processor included within content processing device 110. Instructions in widget 105 may include instructions for displaying content, including interactive program guide data (IPG data) 132, in a graphical user interface (GUI) 112 included in display 115, sometimes according to input provided by a user through control 111.

Control 111 is generally a remote control that selectively communicates with content processing device 110 through known wired or wireless communications, such as infrared (IR) communications. Control 111 generally includes numeric keys for selecting channels of video programming, as well as other keys for making selections and request according to menus provided on video display 115, in addition to arrow keys and the like for changing channels, changing volume, etc. Video display 115 may be a television receiver such as is known, including a conventional television or a high definition television (HDTV).

Content processing device 110 generally includes a processor and a memory, as well as a computer readable medium such as a disk or the like for storing data and computer-executable instructions, e.g., widget 105. Content processing device 110 selectively communicates, via a broadband home router (BHR) 120, with a packet switched network 125 and/or a video distribution network 145. An interactive program guide (IPG) server 130 also selectively communicates with router 120, generally via network 125.

GUI 112 allows viewers of display 115 to obtain information and to select content, generally by navigating and making selections using control device 111.

IPG server 130 generally includes a processor and a memory, as well as a computer readable medium such as a disk or the like for storing data, e.g., IPG data 132, and computer executable-instructions, e.g., widget 105, where the data 132 and widget 105 may be downloaded to content processing device 110. IPG server 130 provides IPG data 132 and widget 105 to content processing device 110 to provide an interactive program guide graphical user interface in GUI 112. Accordingly, widget 105 and IPG data 132 may be downloaded to content processing device and then updated on a regular basis. For example, widget 105 may be updated periodically, e.g., once every twenty-four hours, while data 132 may be updated more frequently, or as warranted, e.g., when available content 150 changes, or new content 150 becomes available.

An IPG database 135 may be included within IPG server 130, or may be part of a separate computing system. In any event, IPG server 130 is generally configured to selectively retrieve information from IPG database 135 in response to requests for IPG data 132. IPG data 132 includes data concerning channels of media content, e.g., video content available to content processing device 110.

A media distribution network 145 is a network for providing media content 150, e.g., a video signal such as is known. For example, network 145 may include hardware and software for providing a video signal via coaxial cable and/or fiber optic cable. Further, media content 150 may be provided to the video distribution network 145 as a video signal from a head end 155, as is known.

One or more video hub offices (not pictured), sometimes referred to as "VHOs," may serve as a point of aggregation and distribution for media content. For example, a video signal, e.g., a video signal encoded as a Motion Picture Experts Group-2 (MPEG 2) stream, may be provided from a head end through a media distribution network 145 to a video hub office. Accordingly, IPG server 130 may be located in a VHO. Further, IPG server 130 or some other server in the VHO may receive media content 150 from the media distribution network 145, e.g., one or more video signals, and may combine such media data 150 with IPG data 132 for delivery to content processing device 110.

Packet switched network 125 is generally an internet protocol (IP) network. As such, network 125 uses known protocols for transporting data, such as user datagram protocol (UDP), transport control protocol (TCP), hypertext transfer protocol (HTTP), etc. Further, network 125 may include a variety of networks such as a wide area network (WAN), e.g., the Internet, a local area network (LAN), etc. As is known, packet switched network 125, may be used to transport a variety of data, including multimedia data such as audio and video. Accordingly, it is to be understood that networks 125 and 145 may in fact be combined into a single network, or that video distribution network 145 may simply be omitted, whereby packet switched network 125 is used to provide video signal 150 to content processing device 110, possibly through a video hub office as discussed above.

BHR 120 is known for distributing audio, video, and data to devices within customer premises 101, such as content processing device 110. For example, BHR 120 may be a broadband home router or wireless broadband home router from Actiontec Electronics, Inc. of Sunnyvale, Calif.

Computing devices such as content processing device 110, IPG server 130, etc. may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

Content processing device 110 generally is a specialized device for receiving media content, e.g., video signals, from head end 155 via network 145, e.g., via a VHO, and may be provided with a proprietary or specialized operating system other than those enumerated above. For example, content processing device 110 may be an STB provided with a real time operating system (RTOS) such as is known. However, it is to be understood that content processing device 110 may be a computing device such as one of those enumerated above, so long as the computing device is capable of media content 150 from network 145, and also is capable of storing and executing the instructions included in widget 105. Generally, due to limited permanent memory in the content processing device 110, widget 105 is downloaded to the device 110 from IPG server 130 when needed, and is stored in temporary memory. However, the widget 105 providing instructions to the device 110 for providing GUI 112, e.g., as discussed herein, may be stored permanently in the device 110.

Computing devices such as content processing device 110, IPG server 130, widget data server 135, etc. generally each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Databases or data stores described herein may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

Figure 2A:
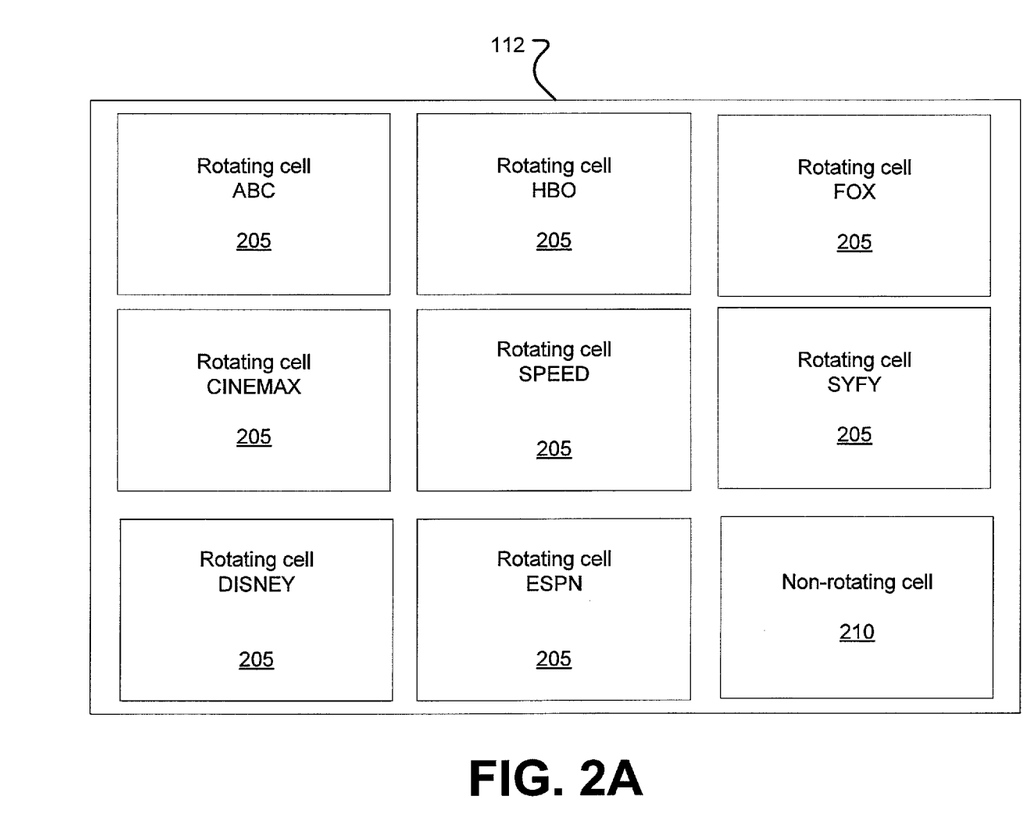
FIG. 2A illustrates an exemplary display of media content in rotating and non-rotating cells in a graphical user interface.

FIG. 2A illustrates an exemplary display of media content 150 in a GUI 112. As can be seen, FIG. 2A illustrates a three cell by three cell grid that includes nine cells. The size and dimensions of the grid shown in FIG. 2A, and subsequent figures, is exemplary and not limiting; GUI 112 could include grids of different dimensions and/or different numbers of cells. The cells included in GUI 112 include rotating cells 205 and non-rotating cells 210. That is, widget 105 includes instructions to display, in each of the nine cells 205 or 210, a channel of media content 150. Generally, the channels of media content 150 are displayed in cells 205 as moving video images, e.g., according to the Motion Picture Experts Group (MPEG) standard or the like, and audio may be provided as discussed elsewhere herein, although still pictures or images could be displayed as well. The channels of media content 150 included in cells 205 are generally a subset of all of the channels of media content 150 available from media distribution network 145, e.g., network 145 could provide one hundred or more channels of content 150, and GUI 112 could include nine cells 205.

Further, some or all of the channels of media content 150 available to content processing device 110 through the media distribution network 145 may be rotated (also referred to as "cycled") through some or all of the rotating cells 205. Widget 105 may include instructions for selecting channels of content 150 to be provided in rotating cells 205. Because as many as all of the channels of content 150 available through media distribution network 145 may be selected as rotating content 205, many, e.g. hundreds or more, of channels of media content 150 may be available for inclusion in cells 205. Thus, generally, GUI 112 will not provide as many rotating cells 205 as there are channels of content 150 available through media distribution network 145 and selected for inclusion in cells of rotating content 205.

If, as will often be the case, more channels 150 are selected for rotating cells 205 than cells 205 are available, the channels of content may be provided according to some predetermined order of priority, e.g., channel number, alphabetic order of channel names, etc. Rotating cells 205 generally displays available channels on a round-robin basis, although it is possible to implement a weighting scheme or some other set of rules whereby some channels are included as rotating cells 205 more often than other channels.

Generally, selections of media content 150 for inclusion in rotating cells 205 are made by a provider of media content 150 and are included in IPG data 132 provided to widget 105. However, widget 105 could include instructions for allowing a user to select channels of media content 150 to be included in cells of rotating content 205. Further, widget 105 could include instructions for storing such selections in a computer readable medium included in content processing device 110. Accordingly, a user could select channels to be included in the grid of GUI 112, and have such selections persist across multiple viewing sessions, and could also modify such selections as desired.

The content of rotating cells 205 may be rotated, or cycled, according to a variety of mechanisms. For example, widget 105 could be programmed to cycle the contents of rotating cells 205 at periodic intervals, e.g., every 30 seconds. Additionally or alternatively, widget 105 could be programmed to cycle the contents of rotating cells 205 upon receiving a user command, e.g., via control 111. Further, the order in which content is rotated may be determined according to instructions provided in widget 105. Widget 105 could also be programmed to allow a user to specify the order in which content is rotated through the cells 205.

Content may be rotated through the cells 205 in any order. For example, referring again to FIG. 2A, a channel of media content 150 might first be displayed in the cell 205 in the uppermost and leftmost position of GUI 112, then be rotated to the right, and then to the leftmost cell 205 that is between the uppermost and bottom row of cells in the GUI 112, i.e., to the leftmost cell 205 in the row that is in the vertical middle of the grid in the GUI 112. In the example of FIG. 2A, when a channel of media content 205 reaches the cell 205 immediately to the left of non-rotating cell 210, upon the next cycle, that channel of media content 150 is rotated out of the GUI 112, i.e., is not displayed in any cells 205. As mentioned above, channels of media content 150 not being displayed in GUI 112 may be queued for display according to instructions included in widget 105.

In contrast to rotating content 205, a non-rotating cell 210 includes a channel of media content that generally does not change. Rotating cells 205 generally display different channels of media content 150 at different times as described above. However, a non-rotating cell 210 generally displays a predetermined channel of media content 150 at a predetermined location in GUI 112, and does not display any other channels of media content 150, and does not change the content that it displays at different times. Thus, non-rotating cells 210 may also be referred to as fixed content 210.

A channel of media content 150 to be displayed in a non-rotating cell 210 is generally predetermined by the provider of media content 150. The selection of a channel for non-rotating cells 210 may be included in instructions included in widget 105, or may be included in IPG data 132 provided to widget 105. Further, although the figures herein illustrate only one non-rotating cell 210 in GUI 112, it is possible to include two or more non-rotating cells 210 in GUI 112.

As can be seen in FIG. 2A, when GUI 112 is instantiated, it generally will include a channel of media content 150 displayed in each of the cells 205 and 210. Of course, other content could alternatively or additionally be displayed in the cells 205 or 210. In any event, when multiple media, e.g., video, channels are included in cells 205 and 210, widget 105 is generally programmed to select an audio stream associated with one of the channels to be provided via display 115. For example, widget 105 may be programmed to select an audio stream associated with video being displayed in non-rotating cell 210, whereby such audio is played through a speaker associated with the display 115. If the GUI 112 includes more than one non-rotating cell 210, then widget 105 may include instructions for selecting audio associated with one non-rotating cell 210.

Figure 2B:
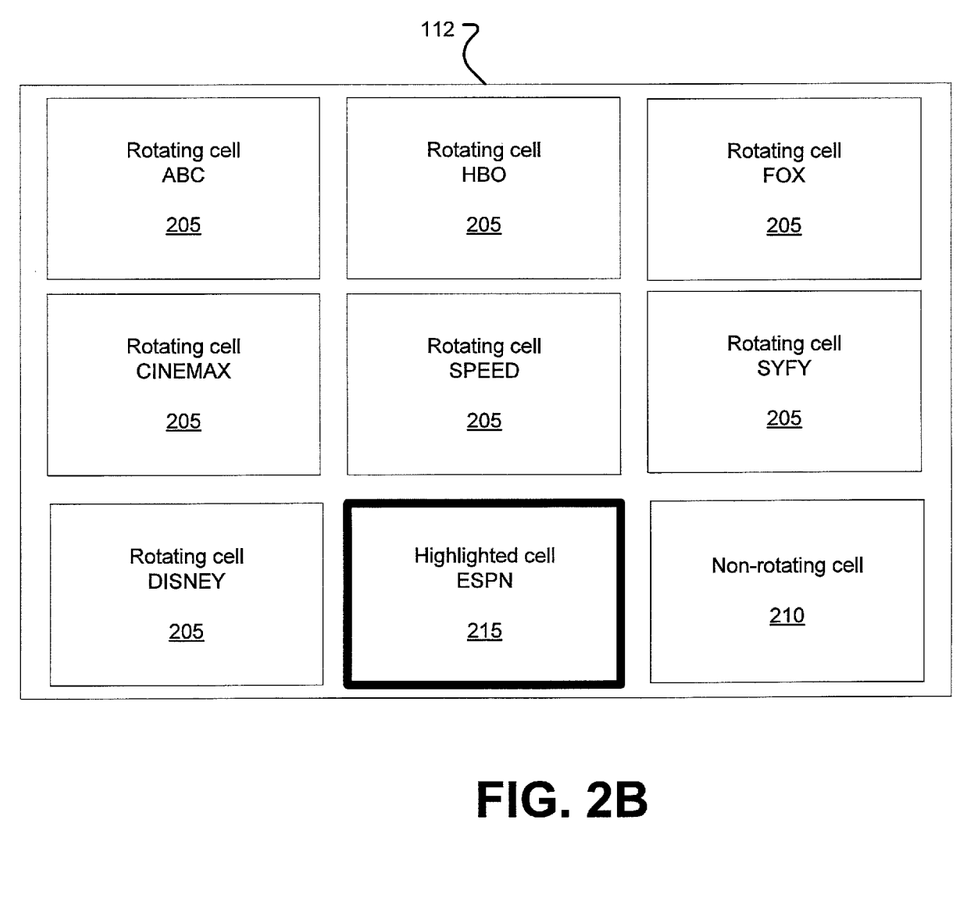
FIG. 2B illustrates an exemplary display including a highlighted cell, along with rotating and non-rotating cells, in a graphical user interface.

FIG. 2B illustrates an exemplary display of media content 150 in a highlighted cell 215, along with rotating and non-rotating cells 205 and 210 in a graphical user interface. A highlighted cell 215 is generally selected by a user using control 111. For example, control 111 may include arrow keys or the like, and widget 105 may include instructions to allow control 111 to provide input to content processing device 110 for scrolling amongst or otherwise indicating cells in the GUI 112. An indicated cell could be highlighted automatically, or could be highlighted upon an input from the control 111, e.g., selection of an "enter" key or the like. In display 115, a highlighted cell 215 may be indicated by an emphasized border such as shown in FIG. 2B, by an icon placed in the cell 215, etc.

Once a cell 215 is highlighted, the cell temporarily becomes, in essence, a non-rotating cell. That is, the cell 215 remains fixed in place much like a non-rotating cell 210. Thus, even if channels of content 150 are cycled through rotating cells 205, the channel of content 150 being displayed in the cell 215 will not change. However, when a cell 215 ceases to be highlighted, e.g., because input from control 111 has indicated that the cell is no longer to be highlighted, that focus should scroll to another cell, etc., what was the highlighted cell 215 reverts to a rotating cell 205.

As mentioned above, generally by default audio associated with a non-rotating cell 210 is provided to be played via display 115. As is discussed further below, it is also possible to select audio associated with another cell to be played via display 115, e.g., according to input from control 111. However, upon an indication of a highlighted cell 215, widget 105 may include instructions to cause audio associated with the highlighted cell 215 to be provided via display 115. Alternatively, indicating a highlighted cell 215 may have no effect on audio being played via display 115.

Figure 2C:
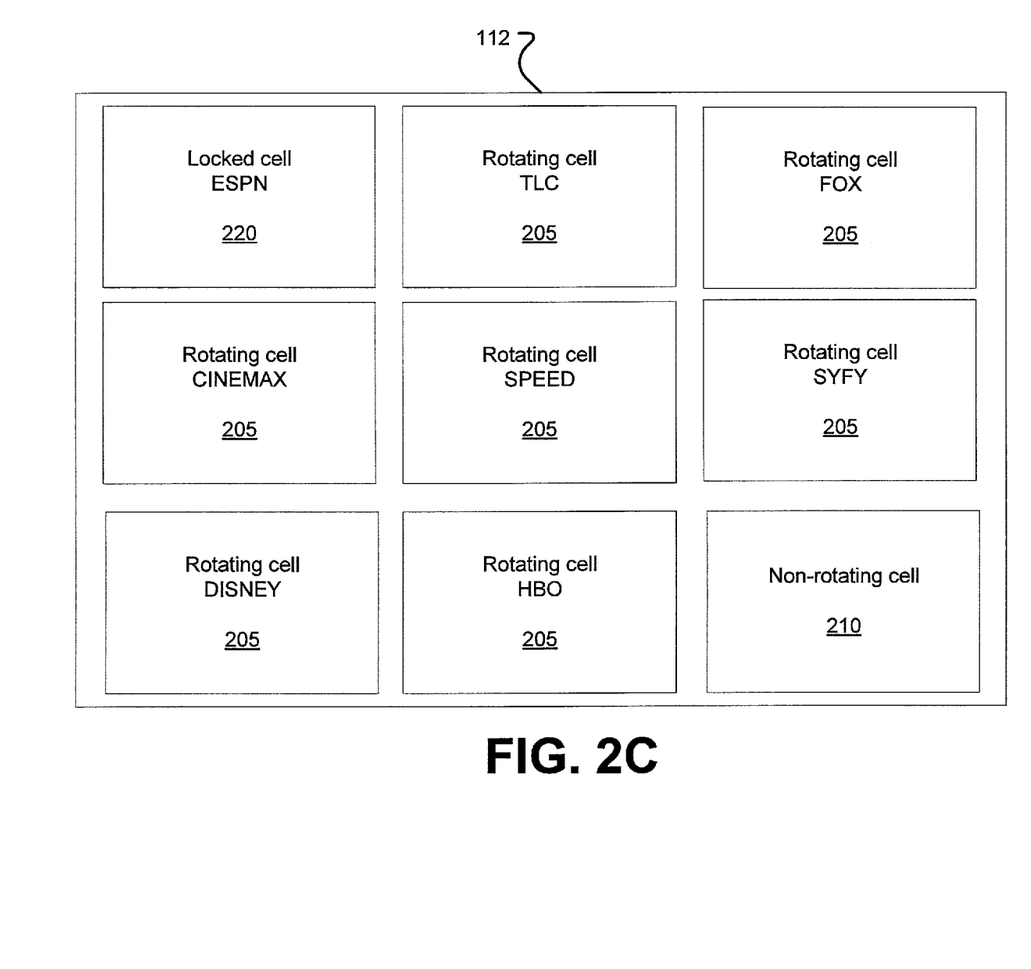
FIG. 2C illustrates an exemplary display including a locked cell, along with rotating and non-rotating cells, in a graphical user interface.

The purpose of indicating a highlighted cell 215 may be to generate a locked cell 220, such as is shown in FIG. 2C. In such event, a locked cell 220 that includes the channel of media content 115 that was displayed in the selected highlighted cell 215 may be placed at a predetermined location in the GUI 112. For example, as shown in FIG. 2C, the content of the highlighted cell 215 shown in FIG. 2B is now included in a locked cell 220 that is displayed in the upper left corner of the grid included in GUI 112. Alternatively, a locked cell 220 may be displayed in the grid at the location of a highlighted cell 215 from which the locked cell 220 was selected, or at some other location.

A locked cell 220, like a highlighted cell 215, is essentially a temporary non-rotating cell 210. That is, the channel of content 150 displayed in a locked cell 220 remains static while the content 150 displayed in cells 205 changes. When a locked cell 220 is selected, display 115 could be caused to provide audio associated with the content 150 being displayed in a locked cell 220. Alternatively, audio associated with the content 150 displayed in the locked cell 220 could be provided via display 115 according to input received via control 111.

Figure 2D:
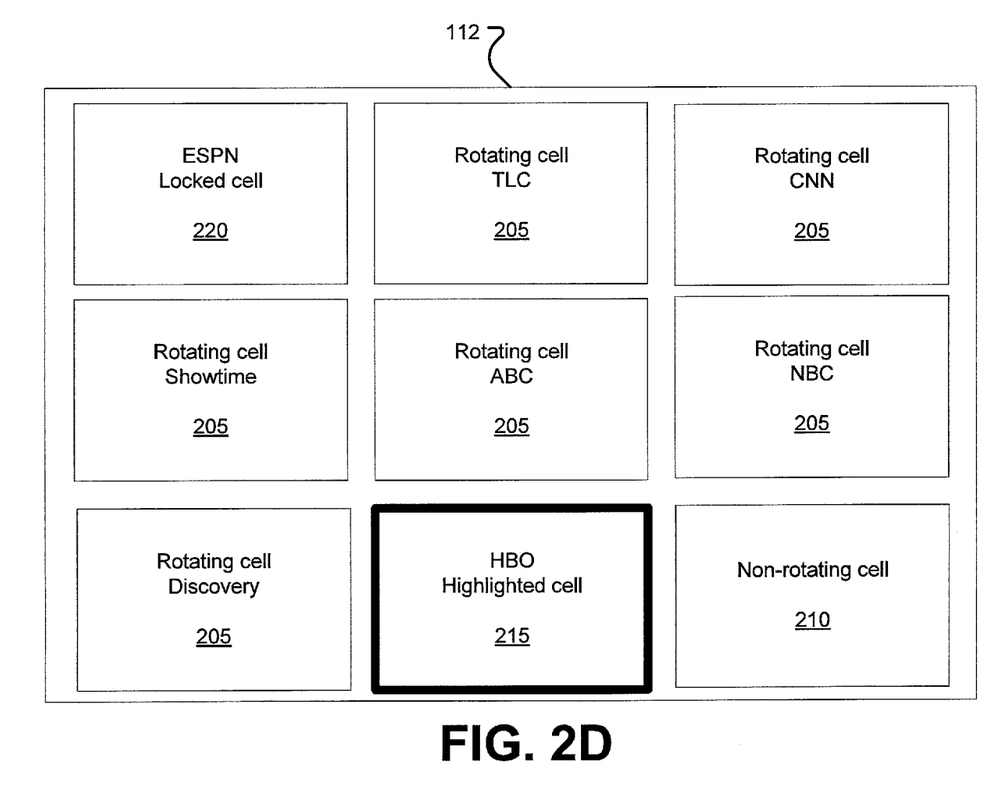
FIG. 2D illustrates an exemplary display including a highlighted cell, along with a locked cell, and rotating and non-rotating cells, in a graphical user interface.
Figure 2E:
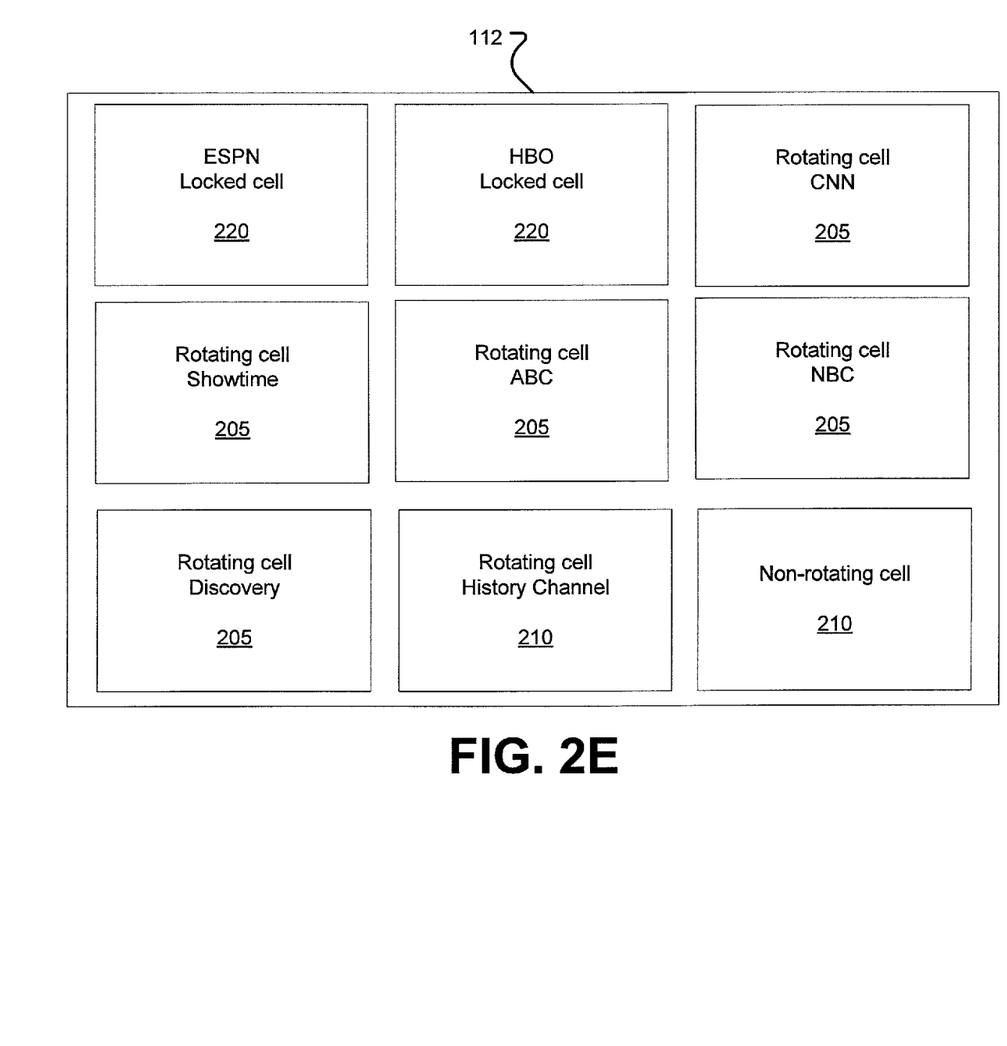
FIG. 2E illustrates an exemplary display including two locked cells, and rotating and non-rotating cells, in a graphical user interface.
Figure 2F:
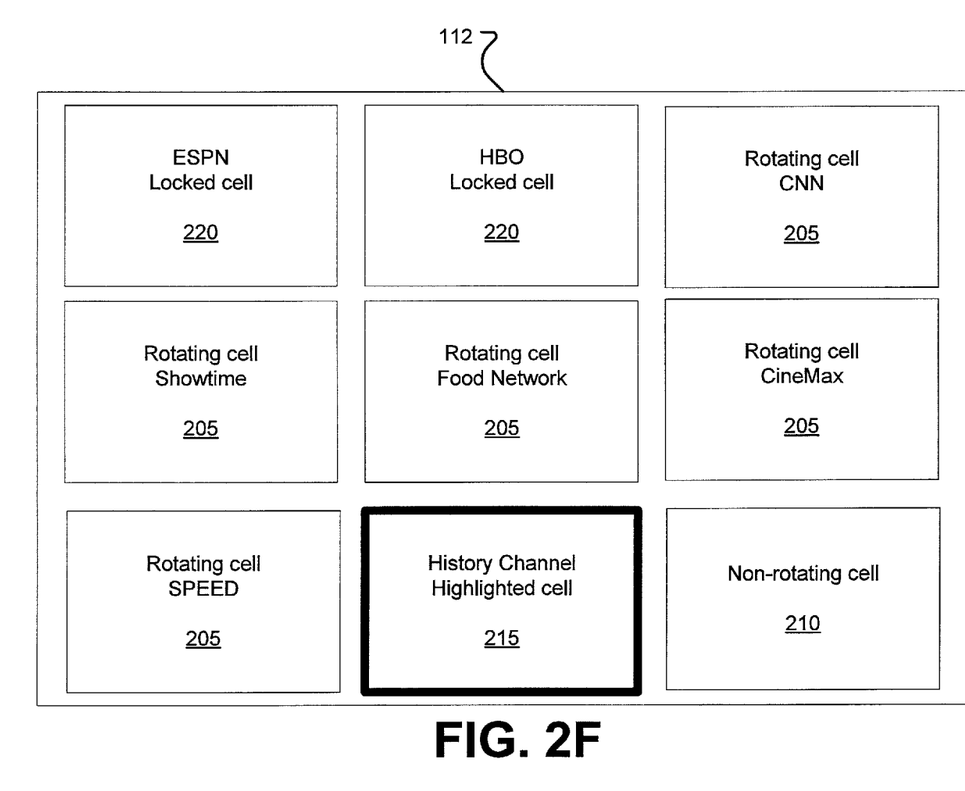
FIG. 2F illustrates an exemplary display including a highlighted cell, along with three locked cells, and rotating and non-rotating cells, in a graphical user interface.
Figure 2G:
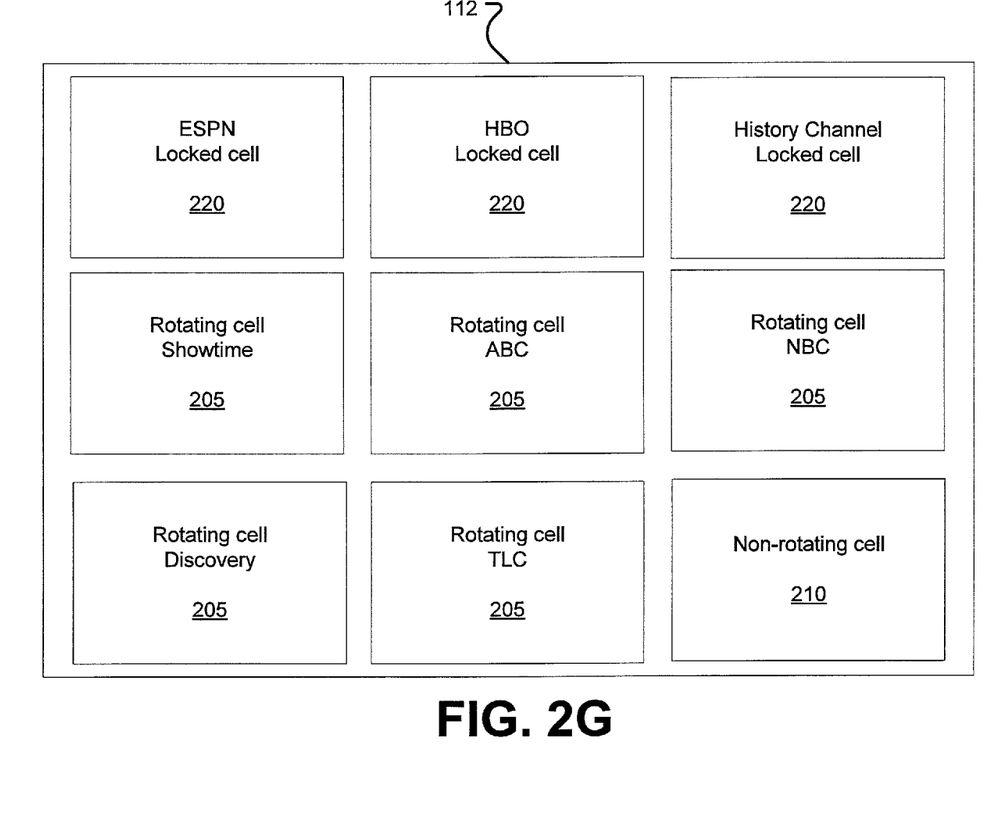
FIG. 2G illustrates an exemplary display including three locked cells, and rotating and non-rotating cells, in a graphical user interface.

Locked cells 220 may be unlocked, i.e., may revert to rotating cells 205, e.g., according to input received via control 111. Further, more than one locked cell 220 may be included in GUI 112. FIG. 2D illustrates indicating a highlighted cell 215, and FIG. 2E illustrates that highlighted cell 215 being selected as a second locked cell 220 in GUI 112. Moreover, FIG. 2F illustrates indicating a highlighted cell 215, and FIG. 2G illustrates that highlighted cell 215 being selected as a third locked cell 220 in GUI 112.

Figure 2H:
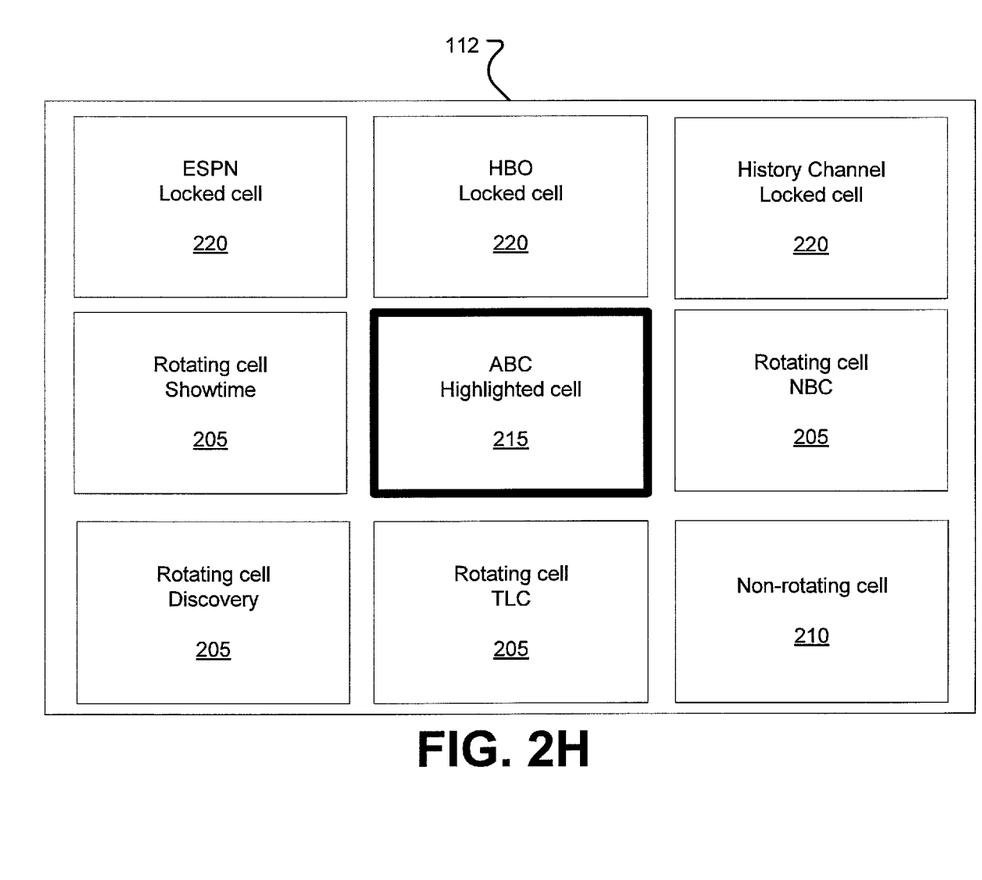
FIG. 2H illustrates an exemplary display including a highlighted cell, along with three locked cells, and rotating and non-rotating cells, in a graphical user interface.
Figure 2I:
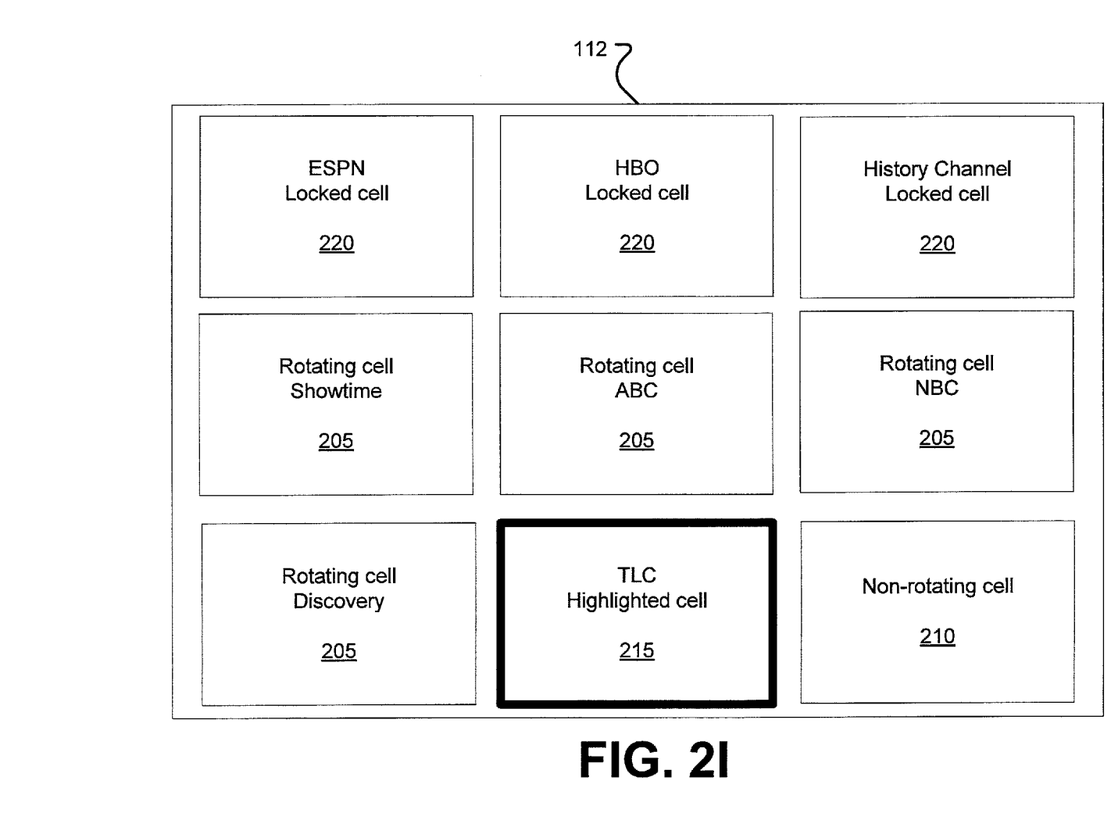
FIG. 2I illustrates an exemplary display including a second highlighted cell, along with three locked cells, and rotating and non-rotating cells, in a graphical user interface.

A comparison of FIG. 2H with FIG. 2I illustrates that a highlighted cell 215 may be indicated without generating a locked cell 220. FIG. 2H shows a highlighted cell 215 being the center cell in the grid in GUI 112. FIG. 2I shows a highlighted cell 215 being the cell immediately below the highlighted cell 215 of FIG. 2H. Thus, using arrow keys or some other mechanism, e.g., via control 111, different highlighted cells 215 may be selected.

Figure 2J:
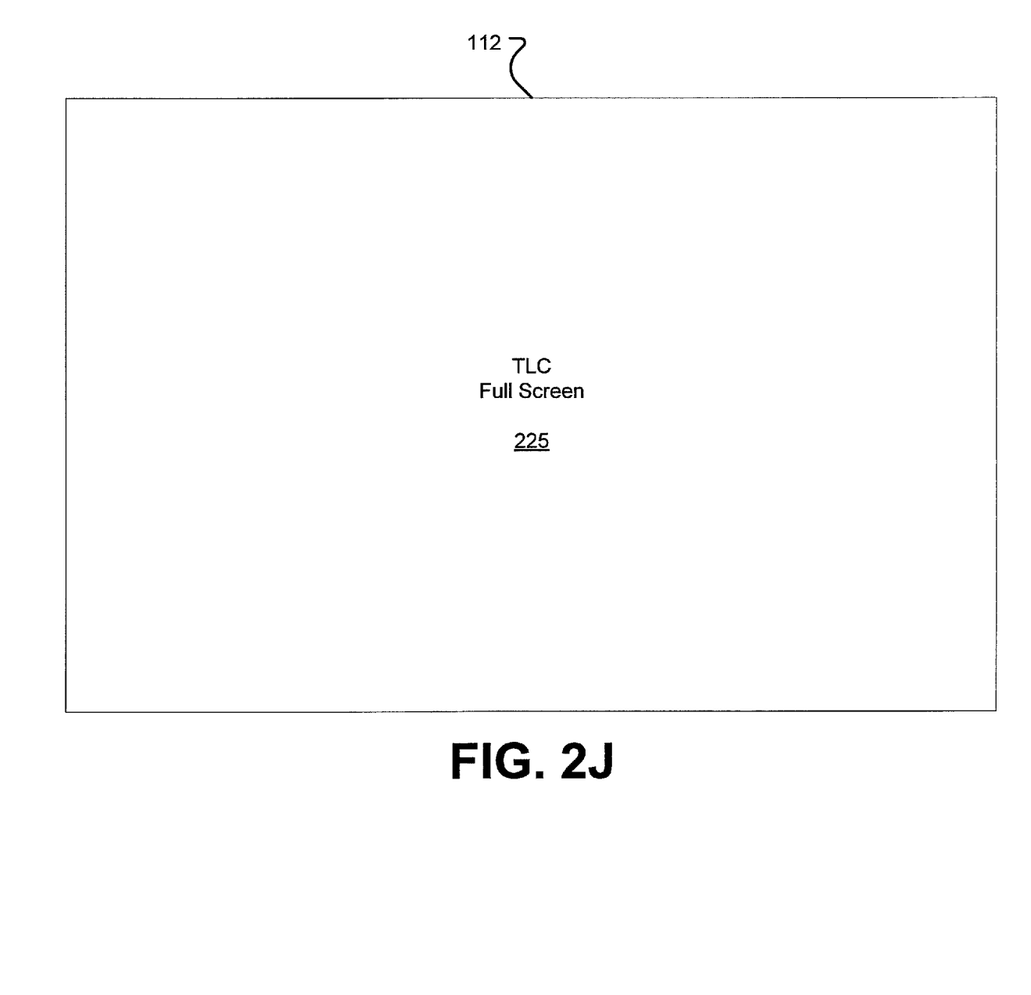
FIG. 2J illustrates an exemplary display of media content in a full screen.

FIG. 2J illustrates a full-screen display 225 of a channel of media content 150 in GUI 112. A channel of media content 150 may be selected for full-screen display 225 from a highlighted cell 215. For example, the highlighted cell 215 of the FIG. 2I could be indicated for full-screen display 225, e.g., according to input received from control 111, resulting in a full-screen display 225 as is illustrated in FIG. 2J.

Figure 3:
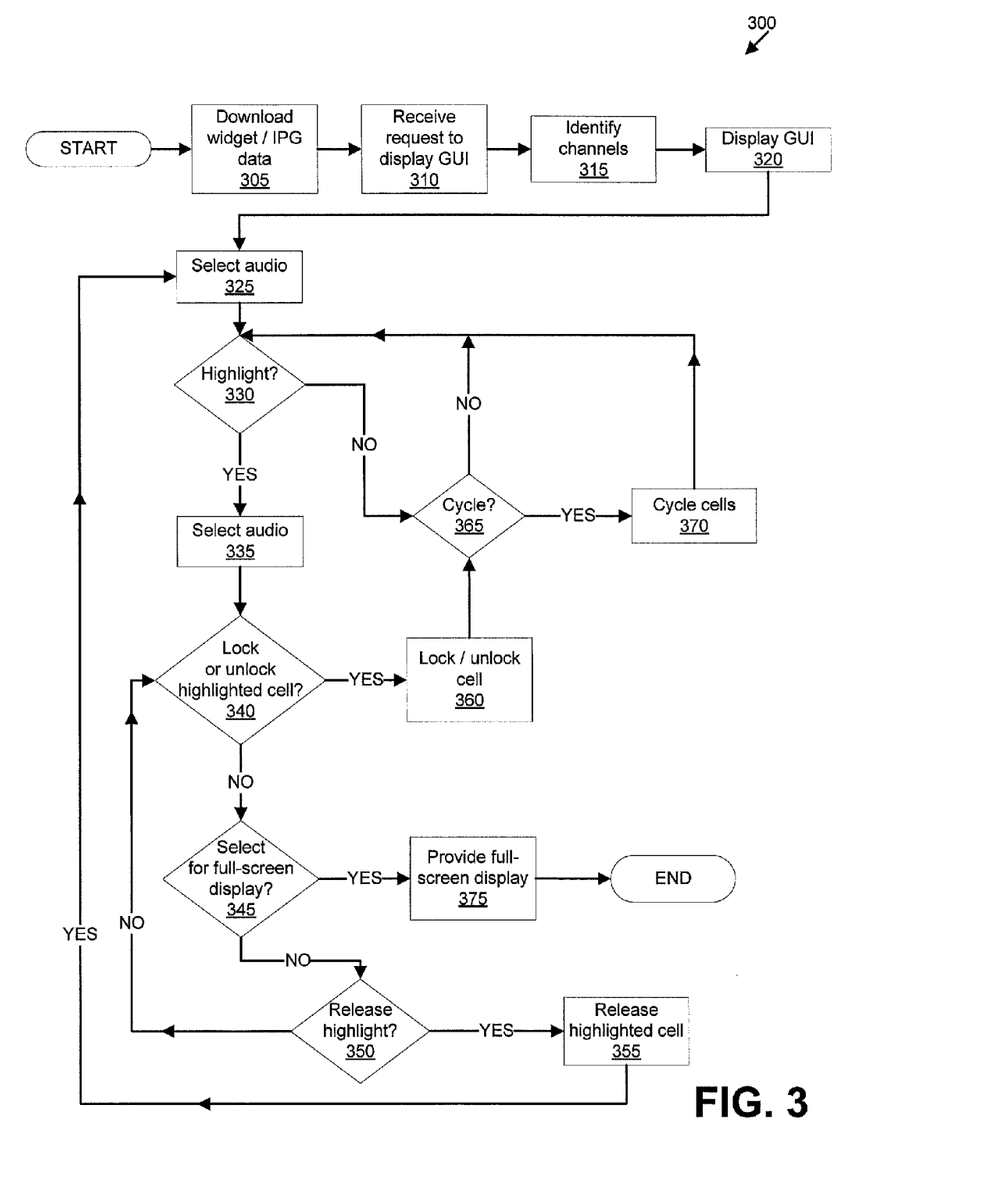
FIG. 3 illustrates an exemplary process for providing multi-view channels.

FIG. 3 illustrates an exemplary process 300 for providing multi-view channels. Generally, process 300 is executed according to instructions stored in content processing device 110, e.g., instructions in widget 105. However, certain steps may be executed in conjunction with, or by other devices, e.g., devices accessed via network 125, such as IPG server 130.

Process 300 begins in a step 305, in which widget 105 and/or IPG data 132, as necessary, are downloaded to content processing device 110, e.g., from IPG server 130. Downloading widget 105 may be initiated upon various events, e.g., powering on content processing device 110, input received from control 111 to view GUI 112, etc. Thus, widget 105 may not be stored in a persistent memory of content processing device 110. However, as mentioned above, widget 105 and IPG data 132 may be downloaded to content processing device, stored in a memory, and then periodically updated, in which case step 305 may not be omitted from process 300.

Next, in step 310, content processing device 110 receives a request, e.g., an input from control 111, to display GUI 112. As mentioned above, steps 305 and 310 may be combined, e.g., a request to display GUI 112 may initiate downloading of widget 310. However, if widget 105 is already downloaded or stored in memory of content processing device 110, then step 310 may be executed separately.

Next, in step 315, content processing device 110 identifies a set of content 150, e.g., channels of content 150, to be included in cells included in GUI 112. In many implementations, all channels of media content 150 available through media distribution network 145 will be included in the set of content 150 identified in step 315. However, in some implementations, a content provider may wish for various reasons to exclude certain channels of content 150 from being included in GUI 112.

By default, selected channels of content 150 are generally included in rotating cells 205. However, as part of step 315, content processing device 110 generally identifies one or more channels of content 150 to each be included in a non-rotating cell 210. For example, a content provider may have certain channels of content 150 that the content provider wishes to showcase or promote to media consumers. Such channels of content 150 may be appropriate for non-rotating cells 210.

Next, in step 320, content processing device 110 provides GUI 112 for display on display device 115. For example, a display such as that described above with respect to FIG. 2A may be provided.

Next, in step 325, content processing device 110 selects an audio stream to be provided to display 115 along with GUI 112. As mentioned above, an initially-selected audio stream may be associated with a channel of content 150 included in a non-rotating cell 210.

Next, in step 330, content processing device 110 determines whether a rotating cell 205 in GUI 112 has been highlighted, thereby generating a highlighted cell 215, e.g., as described above with respect to FIG. 2B. If so, process 300 proceeds to step 365. Otherwise, process 300 proceeds to step 335.

In step 335, content processing device 110 selects audio associated with a channel of content 150 included in the highlighted cell 215 to be provided to display 115. Step 330 is an example of a step is optional. For example, content processing device 110 could continue providing audio associated with content 150 included in a non-rotating cell 210 even after a highlighted cell 215 is generated. Similarly, content processing device 110 could provide audio associated with content 150 included in a locked cell 220 even after a highlighted cell 215 is generated.

Following step 335, in step 340, content processing device 110 determines whether input has been received, e.g., from control 111, to lock or unlock the highlighted cell 215 detected in step 325. That is, if the cell 215 was a locked cell 220, i.e., is associated with a locked condition, then content processing device 110 determines whether input has been received to unlock the cell. Conversely, if the cell 215 was a rotating cell 205, then content processing device 110 determines whether input has been received to lock the cell. Non-rotating cells 210 generally are not available to be locked or unlocked, although such implementations are possible. In any event, if device 110 determines that input has been received to lock or unlock the highlighted cell 215, as appropriate, then process 300 proceeds to step 360. Otherwise, step 345 is executed next.

In step 345, content processing device 110 determines whether input has been received, e.g., from control 111, selecting a full-screen display of the highlighted cell 215. A full-screen display replaces GUI 112 as depicted in FIGS. 2A-2I with a full-screen display 225 of content 150, such as is illustrated in FIG. 2J. If such a request has been received, then step 375 is executed next. Otherwise, step 350 is executed next.

In step 350, content processing device 110 determines whether input has been received to release the highlighted cell 215 from a highlighted condition. If such input has been received, then step 355 is executed next. Otherwise, process 300 returns to step 340.

In step 355, content processing device 110 causes the highlighted cell 315 to be released from its highlighted condition.

As mentioned above, in general, releasing a highlighted cell 215 means that the cell 215 reverts to a rotating cell 205. Following step 350, process 300 returns to step 325. However, in implementations in which step 335 is omitted, process 300 may proceed to step 330 following step 355.

Step 360 follows step 340, as described above. In step 360, content processing device 110 locks or unlocks, as appropriate, and according to input identified in step 340, the highlighted cell 215 identified in step 330.

Next, in step 365, content processing device 110 determines whether an indication has been received to cycle, or rotate, rotating cells 205. As discussed above, cells 205 are generally rotated on a periodic basis, e.g., every 30 seconds, every minute, etc., following a previous rotation (or, for a first rotation, following the instantiation, and provision to display 115, of GUI 112). However, cells 205 could be rotated according to some other indication, e.g., input from control 111. If an indication to cycle rotating cells 205 has been received, step 370 is executed next. Otherwise, process 300 proceeds to step 330.

In step 370, cells 205 are cycled, or rotated. Cells 205 can be rotated in a variety of ways, as discussed above. Very often, rotating cells 205 includes adding a channel of content 150 to GUI 112 that was not displayed in the previous cycle, while dropping from GUI 112 a display of a channel of contents 150 that was included in GUI 112 in the previous cycle. As mentioned above, channels of contents 150 may be queued or otherwise stored for inclusion in the rotation of cells 205 in GUI 112. Following step 370, process 300 returns to step 330.

As mentioned above, step 375 follows the selection of a highlighted cell 215 for full-screen display in step 340. In step 375, the contents 150 of the highlighted cell 215 is provided to display 115 in a full-screen mode, e.g., as illustrated in FIG. 2J.

Process 300 ends following step 375. Certain steps could be omitted, and other steps could be added, to process 300 as described herein. For example, widget 105 could include instructions to allow a user to select an audio stream to be provided to display 115 when GUI 112 is being viewed. Accordingly, a step or steps could be included in process 300 for content processing device 110 to determine whether input was received from control 111 to select a specific cell 205, 210, or 220 to provide audio to display 115. Further, process 300 could end at a point other than following step 375. For example, process 300 could end when content processing device and/or display 115 are powered off, when input is received to end of the process 300, after a predetermined amount of time (e.g., 10 minutes), etc.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A method, comprising:
    identifying, in a content processing device, a set of media channels to be provided in a graphical user interface;
    selecting each channel in a subset of the channels that is to be assigned to a cell that is included in a set of cells in the graphical user interface, wherein at least a subset of the cells includes a plurality of rotating cells having cycling media content from the subset of the channels;
    providing the graphical user interface to a display;
    upon a predetermined indication, rotating at least some of the subset of the channels through the plurality of rotating cells, thereby changing the channel assigned to each of the rotating cells without user interaction each time the rotating is performed and according to a weighting scheme, wherein a first portion of the subset of the channels is included as rotating cells more often than a second portion of the subset of the channels;
    locking the channel of at least one of the rotating cells in response to a user input such that the channel assigned to the locked rotating cell does not change while the other rotating cells change through at least some of the subset of the channels; and
    unlocking the locked channel to revert the locked rotating cell to a rotating cell.

2. The method of claim 1, wherein at least one cell in the set of cells is a non-rotating cell.

3. The method of claim 1, wherein the predetermined indication is a determination that a predetermined amount of time has elapsed since one of the graphical user interface being provided to the display and a previous rotation.

4. The method of claim 1, further comprising highlighting a cell in the graphical user interface to temporarily designate the highlighted cell as a non-rotating cell.

5. The method of claim 1, further comprising providing a selected audio stream to the display along with the graphical user interface, wherein the selected audio stream is associated with one the media channels.

6. The method of claim 1, further comprising receiving a request to provide content included in one of the cells in a full-screen mode, and providing the content to the display in a full-screen mode.

7. A non-transitory computer-readable medium tangibly embodying computer-executable instructions including instructions for:
    identifying a set of media channels to be provided in a graphical user interface;
    selecting each channel in a subset of the channels that is to be assigned to a cell that is included in a set of cells in the graphical user interface, wherein at least a subset of the cells includes a plurality of rotating cells having cycling media content from the subset of the channels;

providing the graphical user interface to a display;

upon a predetermined indication, rotating at least some of the subset of the channels through the plurality of rotating cells, thereby changing the channel assigned to each of the rotating cells without user interaction each time the rotating is performed and according to a weighting scheme, wherein a first portion of the subset of the channels is included as rotating cells more often than a second portion of the subset of the channels;

locking the channel of at least one of the rotating cells in response to a user input such that the channel assigned to the locked rotating cell does not change while the other rotating cells change through at least some of the subset of the channels; and unlocking the locked channel to revert the locked rotating cell to a rotating cell.

8. The medium of claim 7, wherein at least one cell in the set of cells is a non-rotating cell.

9. The medium of claim 7, wherein the predetermined indication is a determination that a predetermined amount of time has elapsed since one of the graphical user interface being provided to the display and a previous rotation.

10. The medium of claim 7, the instructions further including instructions for highlighting a cell in the graphical user interface to temporarily designate the highlighted cell as a non-rotating cell.

11. The medium of claim 7, the instructions further including instructions for providing a selected audio stream to the display along with the graphical user interface, wherein the selected audio stream is associated with one the media channels.

12. The medium of claim 7, the instructions further including instructions for receiving a request to provide content included in one of the cells in a full-screen mode, and providing the content to the display in a full-screen mode.

13. A system, comprising:

a content processing device configured to receive, from a computer server, data concerning a set of media channels, and to:

selecting each channel in a subset of the channels that is to be assigned to a cell that is included in a set of cells in a graphical user interface, wherein at least a subset of the cells includes a plurality of rotating cells having cycling media content from the subset of the channels;

provide the graphical user interface to a display;

upon a predetermined indication, rotate at least some of the subset of the channels through the plurality of rotating cells, thereby changing the channel assigned to each of the rotating cells without user interaction each time the rotating is performed and according to a weighting scheme, wherein a first portion of the subset of the channels is included as rotating cells more often than a second portion of the subset of the channels; and lock the channel of at least one of the rotating cells in the graphical user interface in response to a user input such that the channel assigned to the locked rotating cell does not change while the other rotating cells change through at least some of the subset of the channels; and unlock the locked channel to revert the locked rotating cell to a rotating cell.

14. The system of claim 13, wherein at least one cell in the set of cells is a non-rotating cell.

15. The system of claim 13, wherein the predetermined indication is a determination that a predetermined amount of time has elapsed since one of the graphical user interface being provided to the display and a previous rotation.

16. The system of claim 13, the content processing device further configured to highlight a cell in the graphical user interface.

17. The system of claim 13, the content processing device further configured to provide a selected audio stream to the display along with the graphical user interface, wherein the selected audio stream is associated with one the media channels.

18. The system of claim 13, the content processing device further configured to receive a request to provide content included in one of the cells in a full-screen mode, and providing the content to the display in a full-screen mode.

19. The method of claim 1, wherein the locked rotating cell is unlocked in response to a subsequent user input.

20. The method of claim 1, further comprising determining a priority order for the selected subset of the channels, based in part on another user input, in which to rotate the channels through the plurality of rotating cells.

21. The method of claim 20, wherein determining the priority order for the selected subset of the channels includes designating a first cell to receive a first channel after one rotation and a second cell to receive the first channel after a second rotation.

22. The method of claim 20, wherein the priority order is based upon a user input specifying which cells receive which of the selected subset of the channels.

23. The method of claim 20, wherein the priority order includes at least one of a channel number and an alphabetic order of channel names.

* * * * *